United States Patent
Yamamoto et al.

(10) Patent No.: US 9,524,288 B2
(45) Date of Patent: Dec. 20, 2016

(54) FT DIAGRAM GENERATION AID DEVICE AND FT DIAGRAM GENERATION AID PROGRAM

(75) Inventors: Katsunari Yamamoto, Machida (JP); Youji Hiraoka, Isehara (JP); Yoshiyuki Furukawa, Tsukuba (JP)

(73) Assignee: JATCO LTD, Fuji-Shi (JP)

( * ) Notice: Subject to any disclaimer, the term of this patent is extended or adjusted under 35 U.S.C. 154(b) by 167 days.

(21) Appl. No.: 14/343,646

(22) PCT Filed: Sep. 6, 2012

(86) PCT No.: PCT/JP2012/072782
§ 371 (c)(1),
(2), (4) Date: Mar. 7, 2014

(87) PCT Pub. No.: WO2013/047146
PCT Pub. Date: Apr. 4, 2013

(65) Prior Publication Data
US 2014/0215300 A1   Jul. 31, 2014

(30) Foreign Application Priority Data
Sep. 27, 2011 (JP) ................................. 2011-211325

(51) Int. Cl.
*G06F 17/00* (2006.01)
*G06F 17/24* (2006.01)
(Continued)

(52) U.S. Cl.
CPC ......... *G06F 17/246* (2013.01); *G06F 11/0706* (2013.01); *G06F 11/079* (2013.01);
(Continued)

(58) Field of Classification Search
IPC .................................................. G06F 17/2229
See application file for complete search history.

(56) References Cited

U.S. PATENT DOCUMENTS

| | | | | |
|---|---|---|---|---|
| 2004/0172592 A1* | 9/2004 | Collie | ............... | G06F 17/2229 715/212 |
| 2009/0083576 A1* | 3/2009 | Vlassova | ............ | G06F 17/5009 714/26 |
| 2013/0013993 A1* | 1/2013 | Oh | ..................... | G06F 17/5009 715/212 |

FOREIGN PATENT DOCUMENTS

| | | |
|---|---|---|
| JP | 2006-171820 A | 6/2006 |
| JP | 2009-289020 A | 12/2009 |

OTHER PUBLICATIONS

Saucier; Fault Tree Representation and Evaluation; Mar. 2003; Army Research Laboratory; pp. 1-29.*

(Continued)

*Primary Examiner* — Scott Baderman
*Assistant Examiner* — Steven Golden
(74) *Attorney, Agent, or Firm* — Foley & Lardner LLP

(57) ABSTRACT

An FT diagram aid device is provided with an import portion for obtaining a connection relationship of ruled lines and character strings from first data which is data of an FT diagram expressing a tree structure by the ruled lines and the character strings on a sheet of a spreadsheet program, acquiring an event included in the FT diagram and a connection relationship between events from an obtained connection relationship of the ruled lines and the character strings, and generating second data describing the tree structure of the FT diagram in a markup language based on the same and an editing portion for editing the second data to generate third data describing the tree structure of the edited FT diagram in the markup language.

12 Claims, 18 Drawing Sheets

(51) Int. Cl.
  *G06F 17/22* (2006.01)
  *G06F 17/27* (2006.01)
  *G06T 11/20* (2006.01)
  *G06Q 10/10* (2012.01)
  *G06F 11/07* (2006.01)

(52) U.S. Cl.
  CPC ...... *G06F 17/2247* (2013.01); *G06F 17/2725* (2013.01); *G06Q 10/10* (2013.01); *G06T 11/206* (2013.01)

(56) References Cited

OTHER PUBLICATIONS

Nobuyoshi Yabuki et al., "FTA to Kaiso Bunsekiho o Mochiita Suiryoku Ko Kozobutsu no Shindan ni Kansuru Kisoteki Kento", the 59$^{th}$ Annual Conference of Japan Society of Civil Engineers, Sep. 30, 2004 (Sep. 30, 2004), pp. 231 to 232.

Kaoru Maj Ima, "Kyukyoku no Excel Katsuyo Technique", Nikkei Software, vol. 4, No. 10, Sep. 24, 2001 (Sep. 24, 2001), vol. 4, pp. 98-105.

Akira Kawamata, "99 XML Saishin Jijo", SoftwareDesign, No. 102, Apr. 18, 1999 (Apr. 18, 1999), No. 102, pp. 122-131.

Ryosuke Watabe, 2003 Nen IEICE Communications Society Conference Koen Ronbunshu 2, Sep. 10, 2003 (Sep. 10, 2003), p. 499.

\* cited by examiner

```xml
<?xml version= "1.0" encoding= "SHIFT_JIS" standalone= "no" ?>
- <Fault Tree Document>
    - <Fault Tree Node label= "LOSS OF TRANSMISSION BY PULLEY IS LARGE"
        logic= "OR" verification= "-1" >
        <Fault Tree Node label= "SLIP AMOUNT IS LARGE" logic= "OR"
            verification= "0" />
      - <Fault Tree Node label= "FRICTION FORCE IS LARGE" logic= "OR"
            verification= "-1" >
          - <Fault Tree Node label= "REACTION FORCE IS LARGE" logic= "OR"
                verification= "-1" >
                <Fault Tree Node label= "BELT TENSION IS LARGE"
                    logic= "OR" verification= "0" />
            </Fault Tree Node>
            <Fault Tree Node label= "FRICTION COEFFICIENT IS LARGE" logic= "OR"
                verification= "0" />
        </Fault Tree Node>
    </Fault Tree Node>
    <Block Diagram />
</Fault Tree Document>
```

*FIG. 5*

```
<?xml version="1.0" encoding="SHIFT_JIS" standalone="no" ?>
-<Fault Tree Document>
  -<Fault Tree Node label="TOP EVENT" logic="OR" qstate="+" unit="N" verification="0" >
    <Fault Tree Node label="<EVENT>" logic="OR" verification="0" />
  </Fault Tree Node>
  <Block Diagram />
</Fault Tree Document>
```

```
<?xml version="1.0" encoding="SHIFT_JIS" standalone="no" ?>
-<Fault Tree Document>
  <Fault Tree Node label="TOP EVENT" logic="OR" qstate="+" unit="N" verification="0" />
  <Block Diagram />
</Fault Tree Document>
```

*FIG. 8*

| FAILURE VALUE TERM | FAILURE VALUE STATE CHARACTER STRING |
|---|---|
| HIGH | + |
| LOW | − |
| LARGE | + |
| SMALL | − |
| ... | ... |
| ... | ... |
| ... | ... |

*FIG. 13*

| PHYSICAL QUANTITY TERM | UNIT |
|---|---|
| VOLTAGE | V |
| PRESSURE | Pa |
| LENGTH | m |
| ... | ... |
| ... | ... |
| ... | ... |
| ... | ... |

*FIG. 14*

| | A | B | C | D | E | F | G | H | I | J | K |
|---|---|---|---|---|---|---|---|---|---|---|---|
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | LOSS OF TRANSMISSION BY PULLEY IS LARGE | | | | | | | | | |
| 8 | | | | | SLIP AMOUNT IS LARGE | | | | | | |
| 9 | | | | | FRICTION FORCE IS LARGE | | | REACTION FORCE IS LARGE | | | BELT TENSION IS LARGE |
| 10 | | | | | | | FRICTION COEFFICIENT IS LARGE | | | | |
| 11 | | | | | | | | | | | |
| 12 | | | | | | | | | | | |
| 13 | | | | | | | | | | | |
| 14 | | | | | | | | | | | |

*FIG. 19*

FT DIAGRAM GENERATION AID DEVICE AND FT DIAGRAM GENERATION AID PROGRAM

TECHNICAL FIELD

The present invention relates to a technology of analyzing causes for a nonconformity of a device, a system and the like and of improving its reliability.

BACKGROUND ART

Fault Tree Analysis (FTA) is a method of expanding a failure event to a logical sum (OR) or a logical product (AND) of a lower event causing that to have a tree structure (hereinafter referred to as "FT diagram"), of extracting a significant cause from the lower event, and of reviewing its design in order to prevent occurrence of a fault. Since generation of an FT diagram requires an extensive knowledge and a high degree of specialization in that field, a technology for aiding generation of an FT diagram is in demand (JP2009-289020A).

FIG. 19 is an example of an FT diagram. This example analyzes a failure event in which "loss of transmission by pulley is large". Since this failure event occurs if "slip amount is large" or if "friction force is large", the event that "slip amount is large" and the event that "friction force is large" are lower events of the failure event, and their relationship is a logical sum.

Since the event that "friction force is large" occurs if "reaction force is large" or if "friction coefficient is large", the event that "friction force is large" and the event that "friction coefficient is large" are lower events of the event "friction force is large", and their relationship is a logical sum. Since the event that "reaction force is large" occurs if "belt tension is large", the event that "belt tension is large" is a lower event of the event that "reaction force is large."

In these events, the events that "slip amount is large", "belt tension is large", and "friction coefficient is large", each not having a lower event, are called fundamental events, and in order to prevent occurrence of a failure event, it is necessary to examine a measure against these fundamental events.

In this example, a higher event and a lower event are only connected by a ruled line, and whether the lower event on the same rank is a logical sum or a logical product is not described. This is because, the lower events on the same rank are logical sums in many cases and thus, only between the higher event and the lower event and between the lower events on the same rank are connected by ruled lines in the case of the logical sum, and in the case of a logical product, the term "AND" indicating the logical product is described beside the ruled line connecting the higher event and the lower event to each other.

SUMMARY OF INVENTION

The FT diagram is generated by using a ruled line function in a spreadsheet program including Excel (registered trademark) by Microsoft in many cases. This is because the spreadsheet program has a high diffusion rate, and the high diffusion rate makes an FT diagram generated by an engineer to be used by another engineer suitable.

However, generation of an FT diagram using the spreadsheet program is not efficient, and there is a problem that modification of an FT diagram generated once (addition, deletion or the like of an event) takes a labor.

The present invention has an object to enable easy editing of an FT diagram.

According to an aspect of the present invention, an FT diagram generation aid device provided with an import portion for obtaining a connection relationship of ruled lines and character strings from first data which is data of an FT diagram expressing a tree structure by the ruled lines and the character strings on a sheet of a spreadsheet program, acquiring an event included in the FT diagram and a connection relationship between events from an obtained connection relationship of the ruled lines and the character strings, and generating second data describing the tree structure of the FT diagram in a markup language based on the event included in the FT diagram and the connection relationship between events and an editing portion for editing the second data to generate third data describing the tree structure of the edited FT diagram in the markup language is provided.

According to another aspect of the present invention, a program for allowing a computer to realize an import function for obtaining a connection relationship of ruled lines and character strings from first data which is data of an FT diagram expressing a tree structure by the ruled lines and the character strings on a sheet of a spreadsheet program, acquiring an event included in the FT diagram and a connection relationship between events from an obtained connection relationship of the ruled lines and the character strings, and generating second data describing the tree structure of the FT diagram in the markup language based on the event included in the FT diagram and the connection relationship between events and an editing function for editing the second data to generate third data describing the tree structure of the FT diagram in the markup language is provided.

According to these aspects, FT diagrams can be edited easily.

Embodiments of the present invention and advantages of the present invention will be described below in detail by referring to the attached drawings.

BRIEF DESCRIPTION OF DRAWINGS

FIG. 5 is a diagram illustrating XML data generated by import processing.

FIG. 8 is a diagram illustrating a state in which the lower event is deleted.

FIG. 13 is a diagram illustrating an example of a terminology of a failure value terms.

FIG. 14 is a diagram illustrating an example of a terminology of a physical quantity terms.

FIG. 19 is a diagram illustrating an example of the FT diagram.

DESCRIPTION OF EMBODIMENTS

<Entire Configuration>

Figure 1:
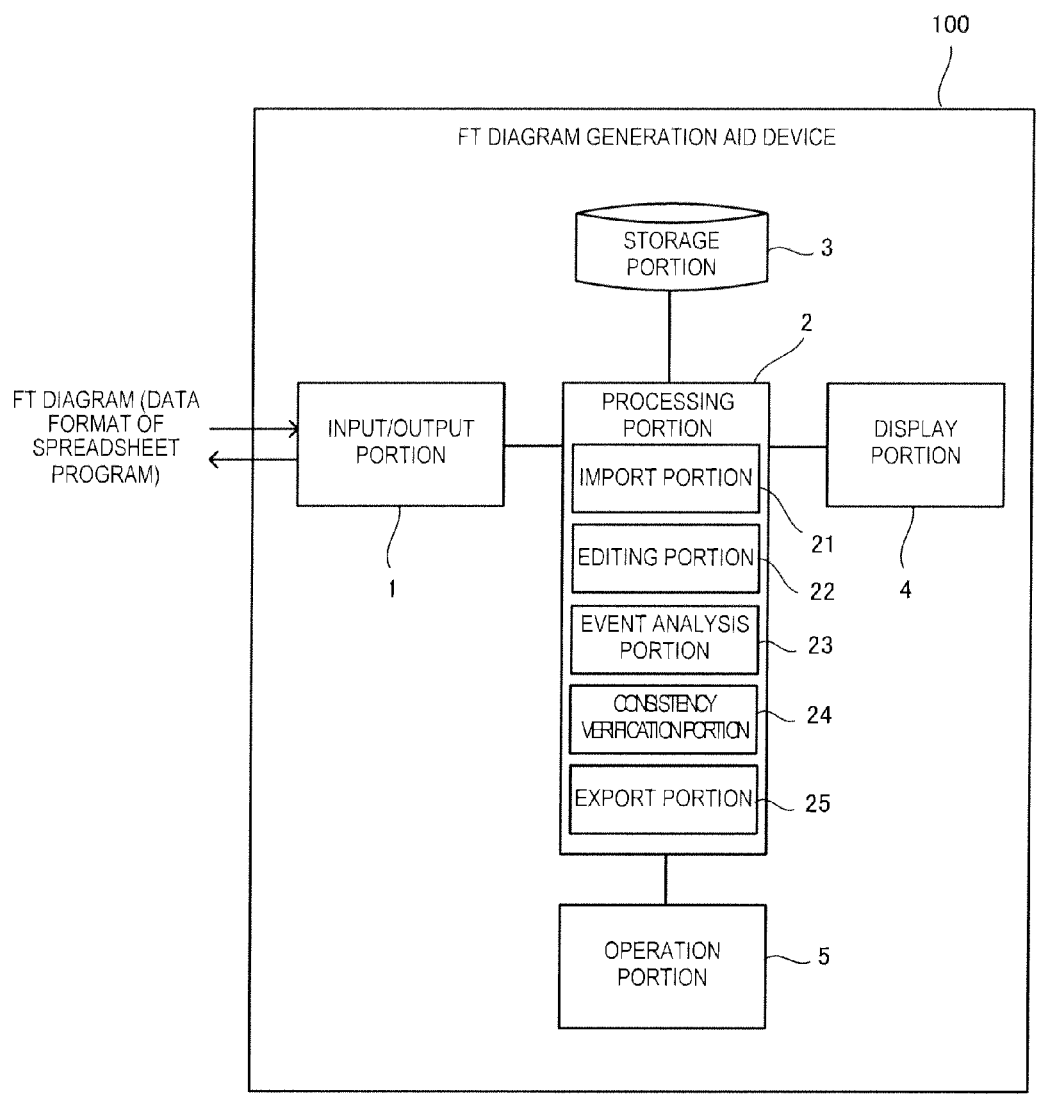
FIG. 1 is an entire configuration diagram of an FT diagram generation aid device.
Figure 2:
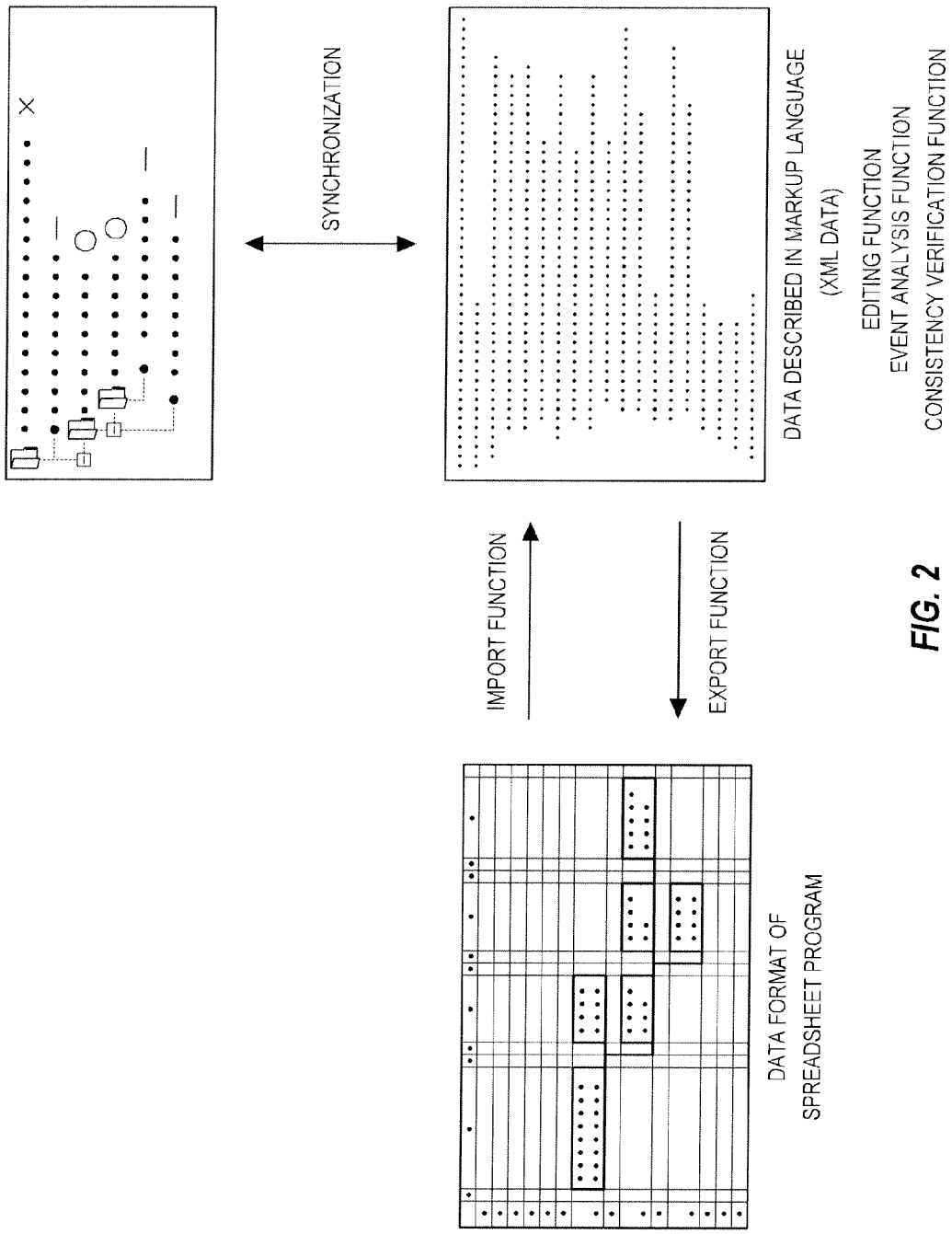
FIG. 2 is a diagram for explaining a function of the FT diagram generation aid device.

FIG. 1 illustrates an entire configuration of an FT diagram generation aid device 100. This device 100 has an input/output portion 1, a processing portion 2, a storage portion 3, a display portion 4, and an operation portion 5, and as illustrated in FIG. 2, the following functions:

an import function of importing data of an FT diagram generated by a spreadsheet program (Excel (registered trademark) by Microsoft, for example) and converting it to data described in a markup language;

an editing function of editing the FT diagram described in the markup language on the display portion 4;

an event analysis function of analyzing specific contents of the event of the FT diagram described in the markup language;

a consistency verification function of verifying consistency (whether an expansion to lower events is correct or not) of the FT diagram described in the markup language before or after editing; and an export function of converting the data of the FT diagram described in the markup language after editing into a data format of the spreadsheet program and exporting it.

The "data of the FT diagram generated by the spreadsheet program" is data of an FT diagram expressing a tree structure by ruled lines and character strings on a sheet of the spreadsheet program. As illustrated in FIG. 19, a character string entered in a cell surrounded by ruled lines is considered as an event, and the tree structure of the FT diagram is expressed by connecting the events by the ruled line.

The "data of the FT diagram described in the markup language" is XML (Extensible Markup Language) data in this embodiment, and contents of each event and the tree structure of the FT diagram are described using a tag. In the following explanation, the "data of the FT diagram described in the markup language" will be described as XML data.

In the XML data, an element of each event is composed of a start tag <FaultTreeNode> and an end tag </FaultTreeNode>. The start tag <FaultTreeNode> includes various attributes (label attribute indicating contents of the event, unit attribute indicating a unit of the physical quantity handled by the event, qstate attribute indicating a failure value state of the event, logic attribute indicating whether the relationship of lower events is a logical sum or a logical product, and verification attribute indicating a consistency verification result of the physical quantity) of the corresponding event.

A hierarchical relationship between a lower event and a higher event is expressed by arranging an element of the lower event between the start tag <FaultTreeNode> and the end tag </FaultTreeNode> of the higher event. Moreover, same-rank events are expressed by arranging their elements arranged in parallel.

The end tag </FaultTreeNode> can be omitted as appropriate if a relationship between events is obvious only with the start tag <FaultTreeNode>.

Each portion constituting this device 100 will be explained. The input/output portion 1 is a wired or wireless network interface, a card reader, a USB connector, a Bluetooth (registered trademark) and the like. The input/output portion 1 is used for exchanging data with an external server, a personal computer and the like. Mainly exchanged data is the data of the FT diagram generated by the spreadsheet program for import to this device 100 and the data of the FT diagram in a data format of the spreadsheet program edited or generated by this device 100 and exported from this device 100.

The processing portion 2 is composed of a microprocessor, a RAM, a ROM and the like. The microprocessor functions as an import portion 21, an editing portion 22, an event analysis portion 23, a consistency verification portion 24, and an export portion 25 realizing each of the aforementioned functions by reading and executing a program stored in the ROM or a storage portion 3 which will be described later into the RAM. Specific processing contents of each portion will be described later.

The storage portion 3 is a storage device such as a hard disk, a flash memory and the like. The storage portion 3 stores data and a program required in the processing of the processing portion 2.

The display portion 4 is a display device such as a liquid crystal display and the like. The display portion 4 displays the tree structure of the FT diagram, the consistency verification result of the FT diagram, XML data being edited or generated and the like.

The operation portion 5 is an input device such as a keyboard, a mouse, a touch panel and the like. The operation portion 5 receives various operations from a user.

Subsequently, processing contents of each portion of the processing portion 2 will be described.

<Import portion 21>

The import portion 21 has a function of reading the data of the FT diagram generated by the spreadsheet program through the input/output portion 1 and converting it to XML data.

Figure 3:
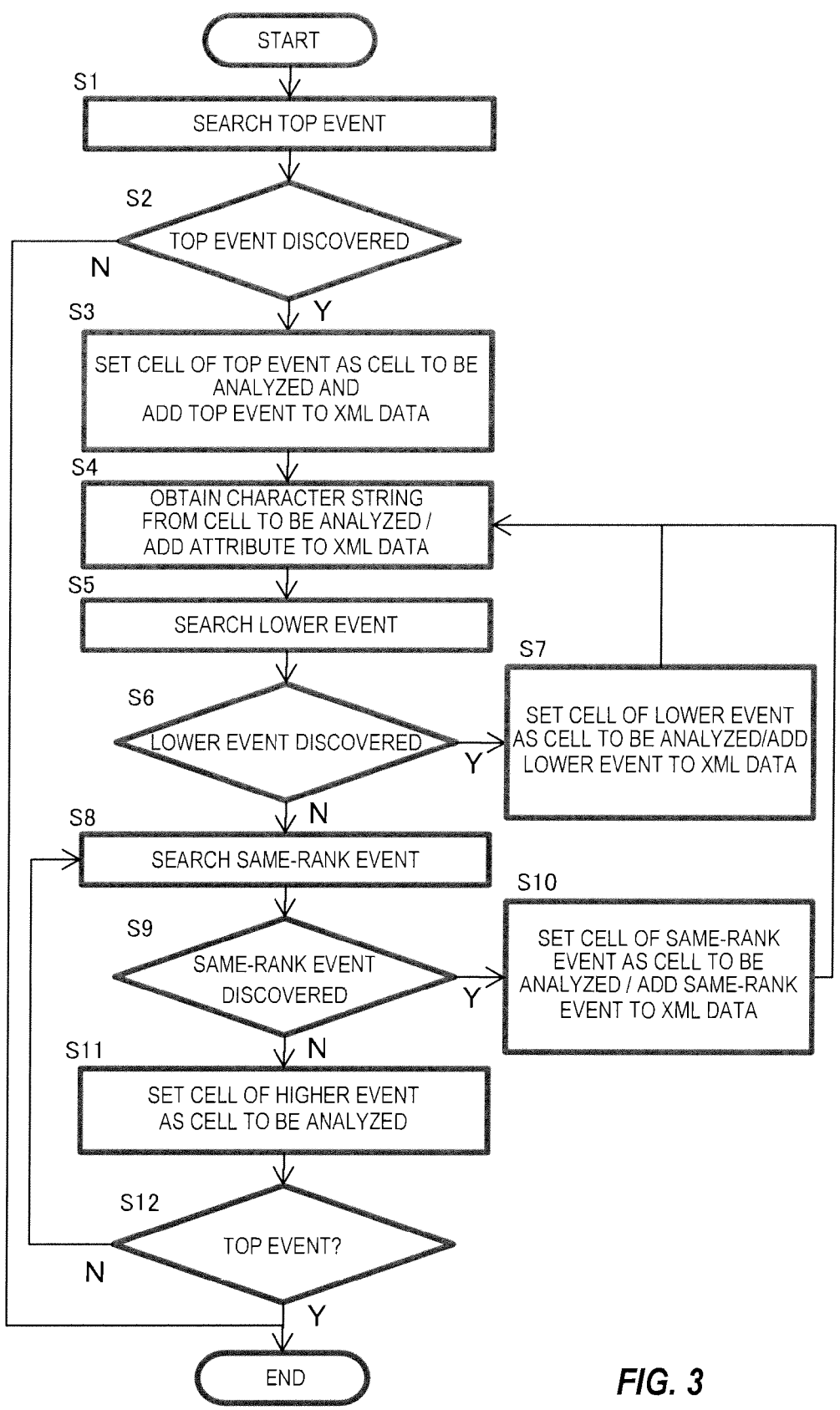
FIG. 3 is a flowchart illustrating processing contents of an import portion.

FIG. 3 is a flowchart illustrating processing contents (contents of the program) of the import portion 21. The processing contents of the import portion 21 will be described by referring to that.

First, at S1, the import portion 21 searches a top event from the FT diagram generated by the spreadsheet program. The top event is an event having no other higher event. Specifically, the import portion 21 searches a cell surrounded by a ruled line in order from the upper left of the sheet. An event may be described by using a plurality of cells, but for simplification of the explanation, only the case described in a single cell will be described.

At S2, the import portion 21 determines whether the top event has been discovered or not. If it is determined that the top event has been discovered, the processing proceeds to S3, while if not, the processing is finished.

At S3, the import portion 21 sets the cell of the discovered top event as a cell to be analyzed. Moreover, the import portion 21 prepares XML data including a start tag <Fault- TreeDocument> and an end tag </FaultTreeDocument> indicating that this is data of an FT diagram and adds the top event to the XML data. Specifically, an element of the top event composed of the start tag <FaultTreeNode> and the end tag </FaultTreeNode> is added between the start tag <FaultTreeDocument> and the end tag </FaultTreeDocument>.

At S4, the import portion 21 obtains a character string from the cell to be analyzed and sets the obtained character string as a label attribute of the event corresponding to the cell to be analyzed. Moreover, the import portion 21 searches a region on the right side of the cell to be analyzed and if there is a character string of "AND", it determines that a lower event of the event corresponding to the cell to be analyzed is a logical product, while if not, it determines that the lower event is a logical sum. Then, the import portion 21 sets "OR" for the logical sum or "AND" for the logical product as the logic attribute of the event corresponding to the cell to be analyzed.

At S5, the import portion 21 searches the lower event of the cell to be analyzed. Specifically, the import portion 21 follows a ruled line extending to the right side from the cell to be analyzed and searches a cell surrounded by the ruled line beyond that.

At S6, the import portion 21 determines if the lower event has been discovered or not. If it is determined that the lower event has been discovered, the processing proceeds to S7, while if not, the processing proceeds to S8.

At S7, the import portion 21 sets the cell of the discovered lower event as the cell to be analyzed and adds the lower event to the XML data. In the XML data, the element of the lower event is arranged between the start tag <FaultTreeNode> and the end tag </FaultTreeNode> of a higher event, which expresses that the event is a lower event. Then, the processing returns to S4, where the label attribute is set to the lower event, and a lower event is further searched.

The import portion 21 repeats the processing at S4 to S7 until no more lower event is discovered.

At S8, the import portion 21 searches an event on the same rank as the cell to be analyzed (hereinafter referred to as the same-rank event). Specifically, a ruled line branching downward from the ruled line extending to the left side from the cell to be analyzed is followed, and a cell surrounded by the ruled line beyond that is searched.

At S9, the import portion 21 determines whether the same-rank event has been discovered or not. If it is determined that the same-rank event has been discovered, the processing proceeds to S10, while if not, the processing proceeds to S11.

At S10, the import portion 21 sets the cell of the discovered same-rank event as the cell to be analyzed and adds the same-rank event to the XML data. An element of the same-rank event is arranged in parallel with the element of another same-rank event, which expresses that the event is the same-rank event. Then, the processing returns to S4, the label attribute is set to the same-rank event, and the lower event and the same-rank event are searched again.

The import portion 21 repeats the processing at S4 to S10 until no more same-rank event is discovered.

At S11, the import portion 21 sets the higher event of the same-rank event discovered immediately before as the cell to be analyzed. Then, at S12, the import portion 21 determines whether the event corresponding to the cell to be analyzed is a top event or not, and if it is a top event, the processing is finished, while if not, the processing returns to S8, and the same-rank event is searched again.

By means of the aforementioned processing, the data of the FT diagram generated by the spreadsheet program is converted to the XML data.

Figure 4:
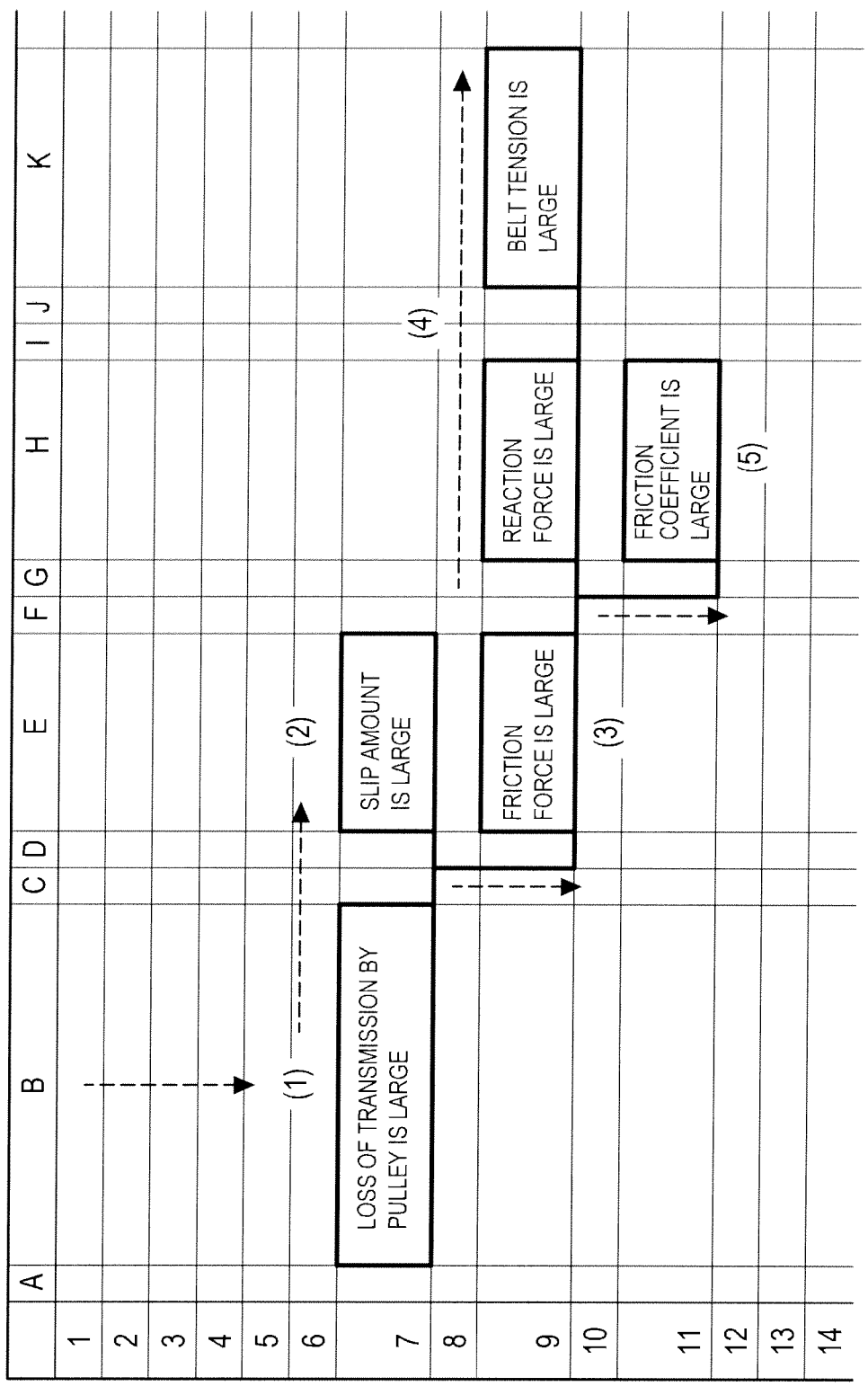
FIG. 4 is a diagram illustrating a state in which an event is searched from data of the FT diagram generated by a spreadsheet program by the import portion.

FIG. 4 illustrates a state in which the event is searched by the import portion 21 from the data of the FT diagram generated by the spreadsheet program.

According to the aforementioned processing, first, a cell described as "loss of transmission by pulley is large" is discovered ((1) in Figure), and a top event "loss of transmission by pulley is large" is added to the XML data.

Subsequently, a cell arranged on the right side thereof and described as "slip amount is large" is discovered ((2) in the figure), and a lower event "slip amount is large" is added to the XML data.

Since there is no cell of another event the right side of the cell described as "slip amount is large", a cell on the same rank is searched, and a cell described as "friction force is large" is discovered ((3) in the figure). Then, a same-rank event "friction force is large" is added to the XML data.

Similarly, cells described as "reaction force is large", "belt tension is large", and "friction coefficient is large", respectively, are discovered ((4) and (5) in the figure), a lower event "reaction force is large", a lower event "belt tension is large" and a same-rank event "friction coefficient is large" are added to the XML data.

FIG. 5 illustrates the XML data generated by the import processing. The tree structure of the FT diagram is expressed by an inclusion relation of the tags <FaultTreeNode> and </FaultTreeNode>, and each event has a label attribute, a logic attribute, and a verification attribute. However, since consistency verification of a physical quantity has not been conducted yet, a provisional value is entered in the verification attribute.

Figure 6:
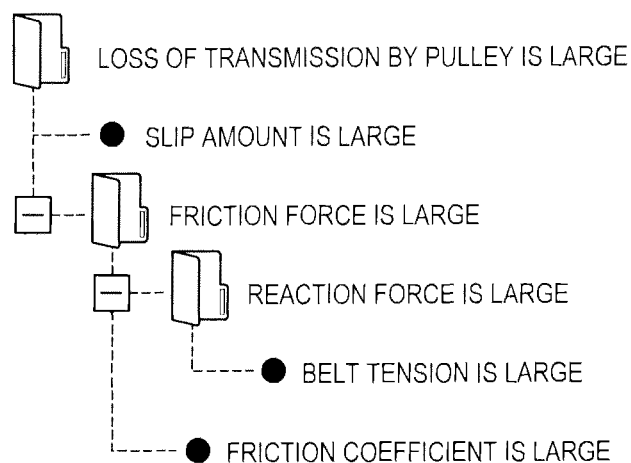
FIG. 6 is an example of a tree structure displayed on a display portion.

Moreover, the tree structure is displayed in a format as illustrated in FIG. 6 on the display portion 4. The displayed tree structure is the same as the tree structure of the FT diagram expressed by the ruled line and the character string, but for visibility of the tree structure, the lower events can be folded up or folded out by clicking an illustration of a folder displayed on the left side of the event having the lower event.

<Editing Portion 22>

The editing portion 22 has a function of modifying the tree structure on the display portion 4 while watching the tree structure of the FT diagram displayed on the display portion 4. If a user changes the tree structure of the FT diagram on the display portion 4 by operating the operation portion 5, the editing portion 22 reflects the change contents in the XML data.

A typical editing function will be described below.

—Addition of Lower Event—

Figure 7:
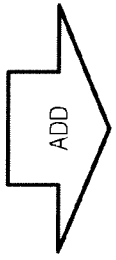
FIG. 7 is a diagram illustrating a state in which a lower event is added to a top event.

FIG. 7 illustrates a state if a lower event is added to a top event. The left side in the figure illustrates displayed contents of the display portion 4, while the right side in the figure illustrates the XML data corresponding to that. Moreover, the upper side in the figure illustrates a state before editing, while the lower side in the figure illustrates a state after editing (the same applies to FIGS. 8 to 10).

If the user selects the top event on the display portion 4, the editing portion 22 makes the display portion 4 display an editing menu (not shown). The editing menu includes "addition", and if the user selects this, a window for inputting an attribute of the event is opened. If the user inputs an attribute such as a label attribute, the editing portion 22 displays the "event" below the top event on the display portion 4.

If such editing work is conducted on the display portion 4, the editing portion 22 reflects the contents in the XML data on a real-time basis, and an element of the "event" is added to the XML data as illustrated on the right side in the figure. Since the <event> is a lower event of the top event, the element of the <event> is arranged below the start tag <FaultTreeNode> of the top event. In this example, the end tag </FaultTreeNode> of the top event is omitted.

—Deletion of Lower Event—

FIG. 8 illustrates a state when a lower event is deleted.

If the user selects the <event> on the display portion 4, the editing portion 22 makes the display portion 4 display the editing menu (not shown). The editing menu includes "delete", and if the user selects this, the editing portion 22 erases the <event> on the display portion 4.

If such editing work is conducted on the display portion 4, the editing portion 22 reflects the contents in the XML data on a real-time basis, and an element of the "event" is deleted from the XML data as illustrated on the right side in the figure.

—Movement of Event—

Figure 9:
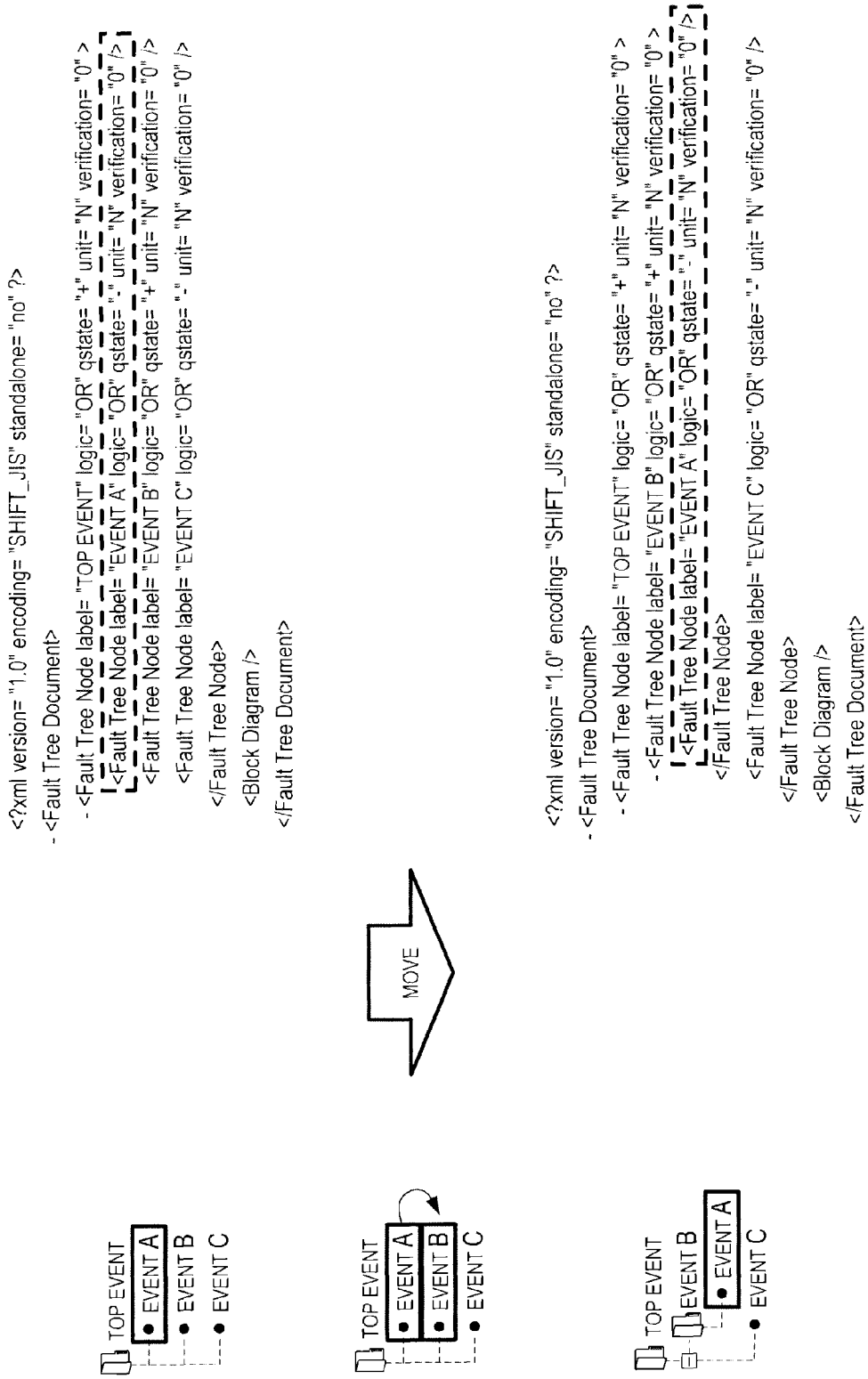
FIG. 9 is a diagram illustrating a state in which the lower event is moved.

FIG. 9 illustrates a state when a lower event is moved.

In this example, an "event A", and "event B", and an "event C" are arranged on the same rank below the top event. If the user selects one of them, that is, the "event A" and drags and drops it on the "event B", the editing portion 22 moves the "event A" below the "event B" on the display portion 4.

If such editing work is conducted on the display portion 4, the editing portion 22 reflects the contents in the XML data on a real-time basis, and an element of the "event A" is moved to a space between the start tag <FaultTreeNode> and the end tag </FaultTreeNode> of the "event B" in the XML data as illustrated on the right side in the figure.

—Copy of Event—

Figure 10:
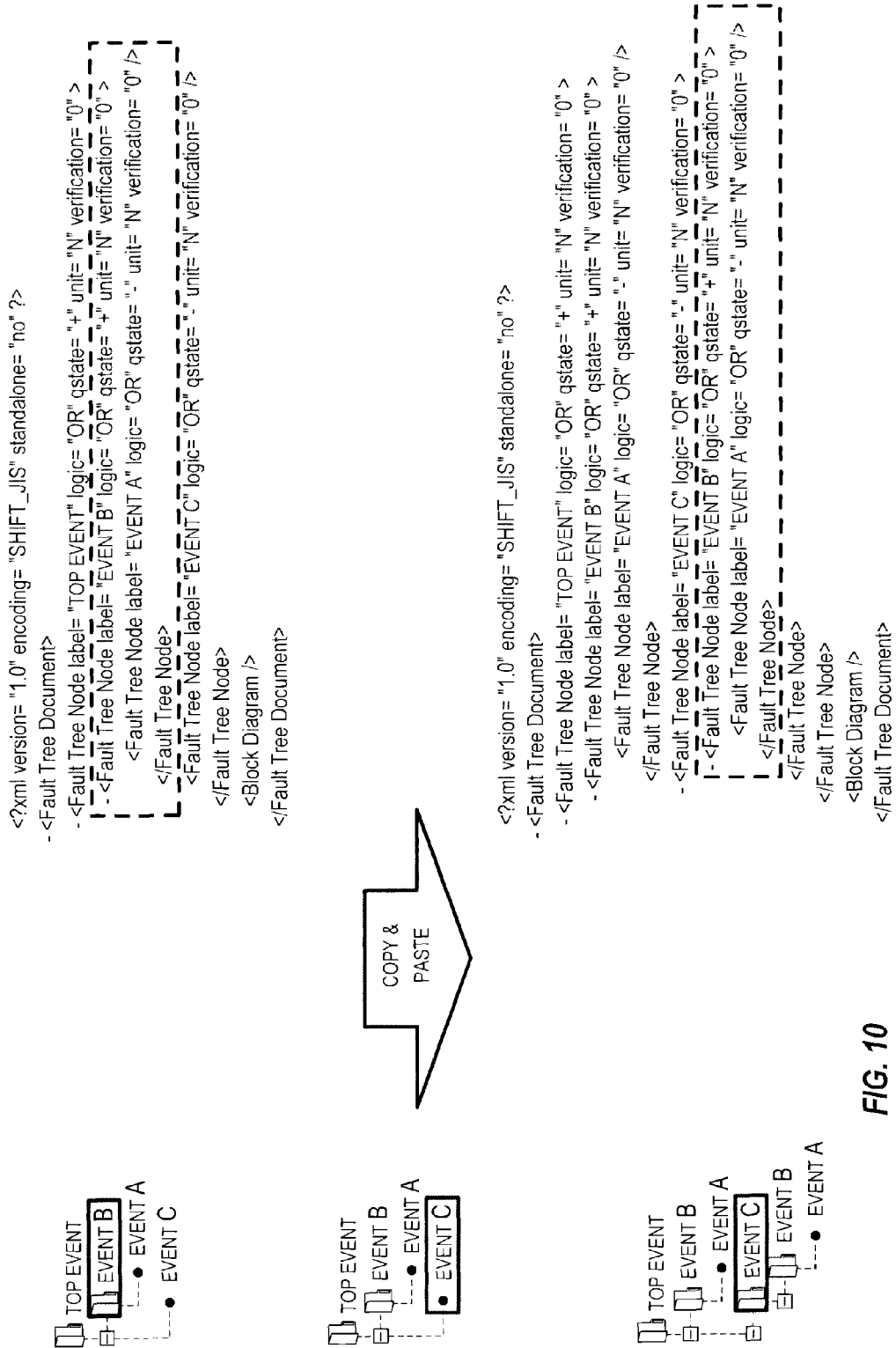
FIG. 10 is a diagram illustrating a state in which the lower event is copied.

FIG. 10 illustrates a state when a lower event is copied.

In this example, the "event B" and the "event C" are arranged on the same rank below the top event, and the "event A" is arranged below the "event B". If the user selects the "event B" on the display portion 4, the editing portion 22 makes the display portion 4 display the editing menu (not shown). The editing menu includes "copy" and "paste", and if the user selects "copy" and continuously selects the "event C" and "paste", the editing portion 22 moves the "event B" and the "event A" below the "event C".

If such editing work is conducted on the display portion 4, the editing portion 22 reflects the contents in the XML data on a real-time basis, and elements of the "event B" and the "event A" are added to a space between <FaultTreeNode> and the end tag </FaultTreeNode> of the "event C" in the XML data as illustrated on the right side in the figure.

The editing function described here is a part of the function of the editing portion 22, but similarly for the other functions, if the tree structure of the FT diagram is changed on the display portion 4, the change contents are reflected in the XML data on a real-time basis.

Therefore, in editing the XML data, the user does not have to be aware of an XML tag or a description method, and the XML data can be easily rewritten only by editing the tree structure displayed on the display portion 4 on the display portion 4.

Here, an example in which the XML data obtained by the import processing is edited was described, but it is possible to newly generate XML data by the editing portion 22 without import.

<Event Analysis Portion 23>

The event analysis portion 23 has a function of analyzing a unit of a physical quantity and a failure value state from the label attribute of each event and of adding a unit attribute and a qstate attribute to each event.

Figure 11:
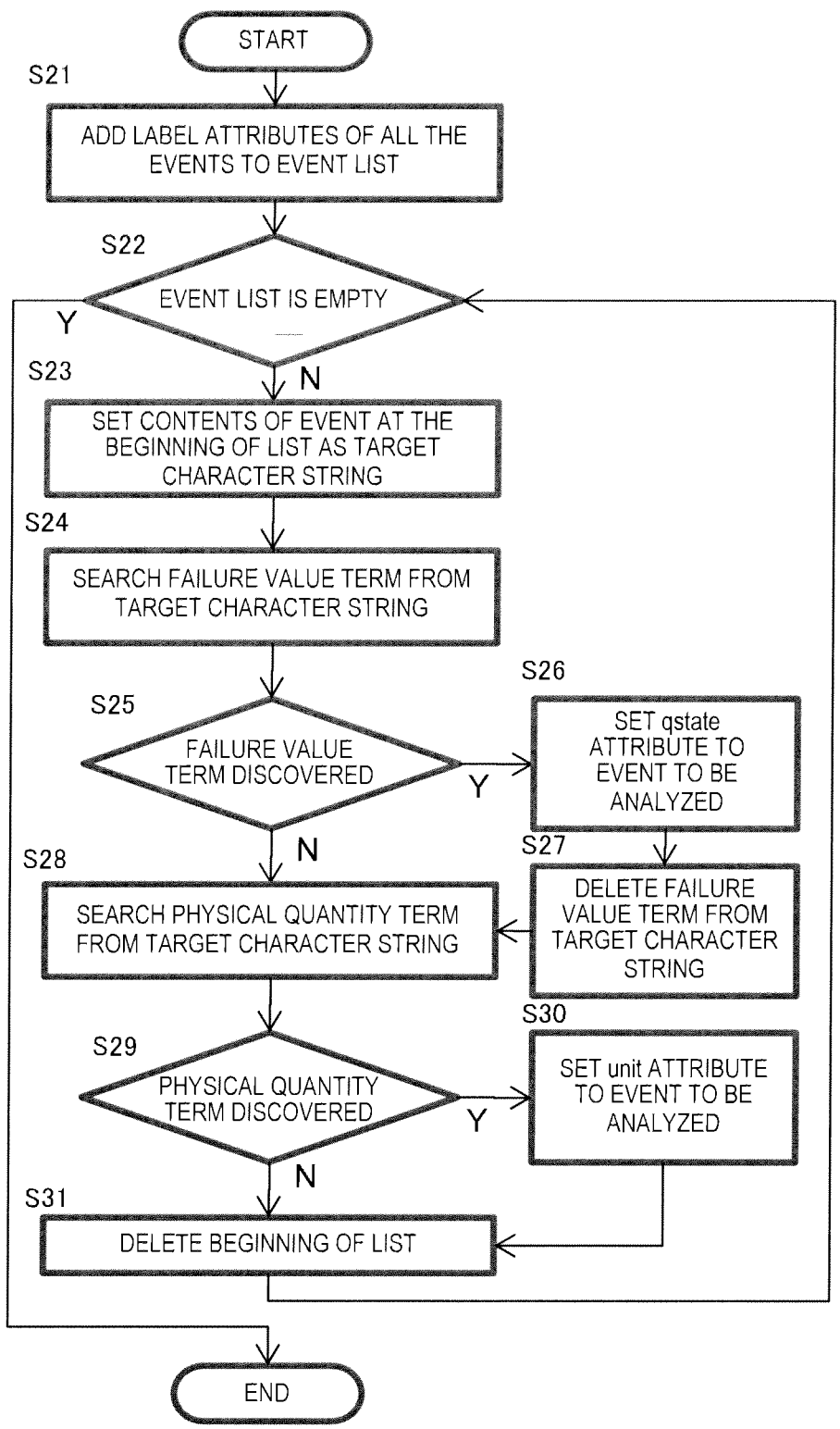
FIG. 11 is a flowchart illustrating processing contents of an event analysis portion.

FIG. 11 is a flowchart illustrating processing contents (program contents) of the event analysis portion 23. Processing contents of the event analysis portion 23 will be described by referring to that.

First, the event analysis portion 23 extracts all the events from the XML data at S21 and adds their label attributes to an event list. The event list is text data for work of this analysis.

At S22, the event analysis portion 23 determines whether the event list is empty or not. If the event list is empty, processing is finished, while if an event is included in the event list, processing proceeds to S23.

At S23, the event analysis portion 23 sets an event at the beginning of the list as an event to be analyzed and sets its contents as a target character string.

Figure 12:
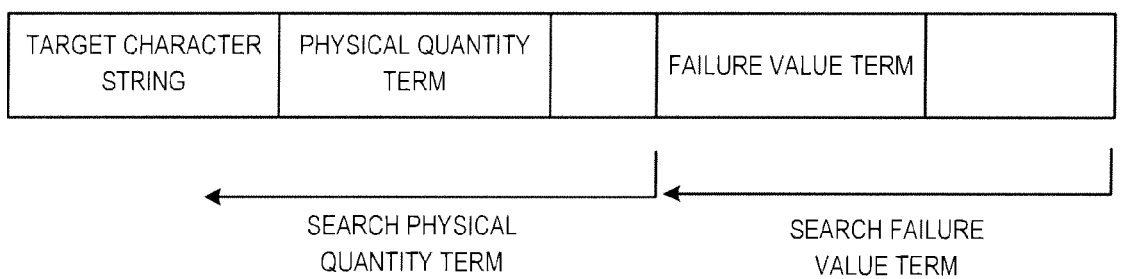
FIG. 12 is a diagram illustrating a state of analysis by the event analysis portion.

At S24, the event analysis portion 23 searches, as illustrated in FIG. 12, a failure value term from the last side of the target character string. In the search, a terminology illustrated in FIG. 13 is used, and the search is made by matching with the terminology. The failure value term is a term indicating in what state the physical quantity included in the event, a failure is caused, and in an event "voltage is high", "high" is a failure value term, and in an event "length is short", "short" is the term.

At S25, the event analysis portion 23 determines whether a failure value term has been discovered or not. If a failure value term is discovered, the processing proceeds to S26, while if not, the processing proceeds to S28.

At S26, by referring to the terminology illustrated in FIG. 13, an attribute of a failure value state corresponding to the discovered failure value term is read, and this is set as a qstate attribute of the event to be analyzed. The qstate attribute is "+" for "high" and "−" for "short".

At S27, the event analysis portion 23 deletes the failure value term from the target character string.

At S28, the event analysis portion 23 further searches, as illustrated in FIG. 12, a physical quantity term from the last side of the target character string. In the search, a terminology illustrated in FIG. 14 is used, and the search for the physical quantity term is made by matching with the terminology. The physical quantity term is, for example, "voltage" for an event "voltage is high" and "length" for an event "length is short".

At S29, the event analysis portion 23 determines whether the physical quantity term has been discovered or not. If the physical quantity term is discovered, the processing proceeds to S30, while if not, the processing proceeds to S31.

At S30, the event analysis portion 23 refers to the terminology illustrated in FIG. 14 and reads a unit of the discovered physical quantity term and sets this as the unit attribute of the event to be analyzed. The attribute of the physical quantity term is "V" for "voltage" and "m" for "length", for example.

At S31, an event at the beginning of the list is deleted, and the processing returns to S22.

Until it is determined at S22 that the event list is empty, processing at S22 to S30 is repeated and the unit attribute and the qstate attribute are set for all the events in the list in the end.

<Consistency Verification Portion 24>

The consistency verification portion 24 has a function of verifying whether an expansion to lower events is done properly on the basis of a relationship in physical quantity of a higher event and a lower event in the XML data before editing or after editing and of setting a verification attribute of each event on the basis of a verification result.

Figure 15:
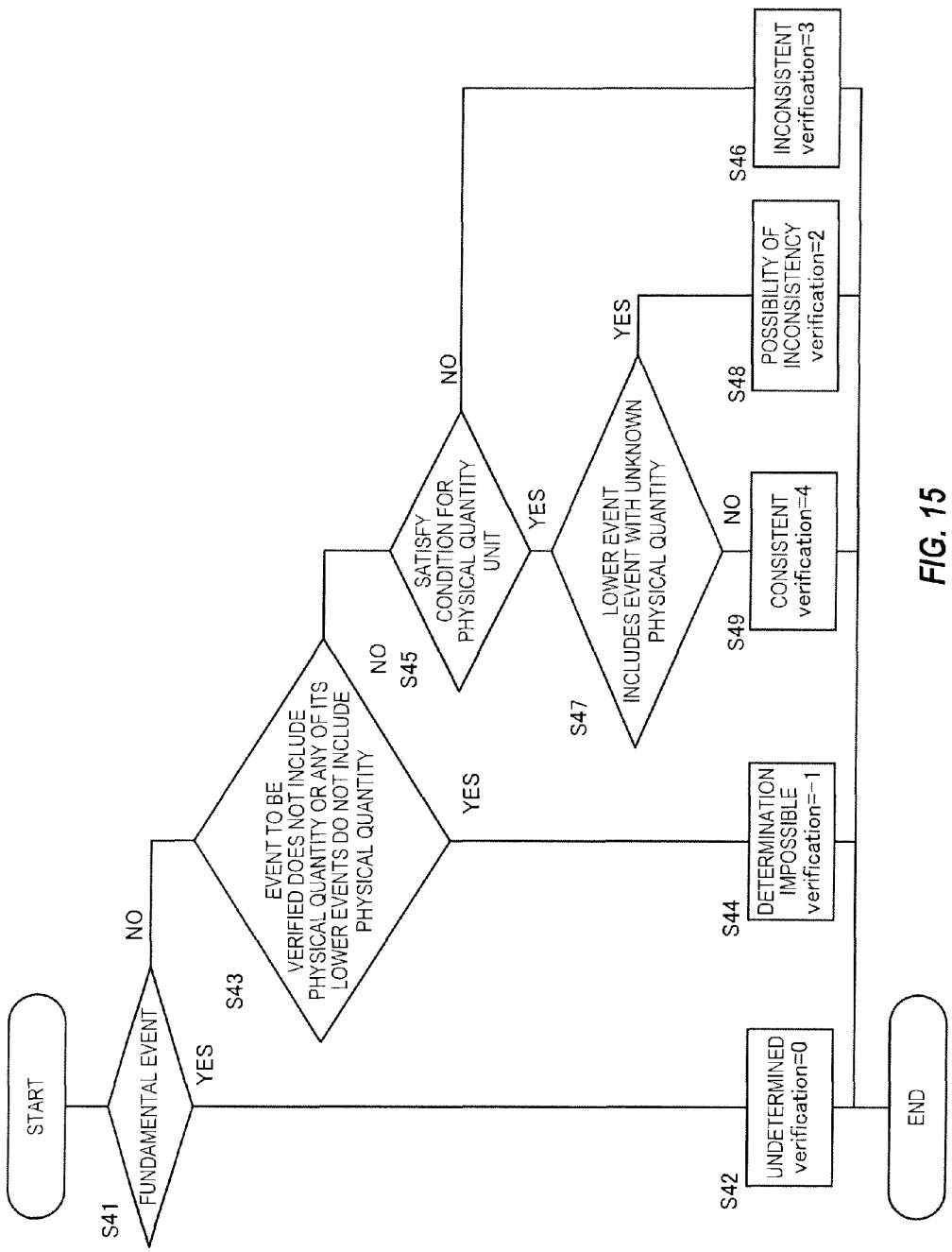
FIG. 15 is a flowchart illustrating processing contents of a consistency verification portion.

FIG. 15 is a flowchart illustrating processing contents (program contents) of the consistency verification portion 24. The processing contents of the consistency verification portion 24 will be described by referring to that.

First, the consistency verification portion 24 determines at S41 if an event to be verified is a fundamental event or not. The fundamental event is a lower event not having an event lower than itself. If an event to be verified is a fundamental event, verification of the consistency does not make sense, and the processing proceeds to S42, and the verification attribute of the event to be verified is set to 0 indicating "unverified". If the event to be verified is not a fundamental event, the processing proceeds to S43.

At S43, the consistency verification portion 24 determines whether any of the following has been established:
an event to be verified does not include a physical quantity
any of lower events of the event to be verified do not include physical quantity If either one of them is established, consistency cannot be verified and thus, the processing proceeds to S44, and the verification attribute of the event to be verified is set to −1 indicating "determination impossible". If neither of them is established, the processing proceeds to S45.

At S45, it is determined whether any of the following is established regarding a physical quantity of the event to be verified and a physical quantity of its lower event:
a unit of the physical quantity of the event to be verified can be expressed by addition/subtraction of the unit of the physical quantity of the lower event. That is, the physical quantity of the event to be verified and the physical quantity of the lower event have the same units.
a unit of the physical quantity of the event to be verified can be expressed by multiplication/division or exponentiation of the physical quantity of the lower event. That is, the unit of the physical quantity of the event to be verified can be expressed by using the unit of the physical quantity of the lower event.

If either one of them is established, there is a possibility of consistency (expansion to lower events are done properly), and the processing proceeds to S47 for further verification. If not, since consistency is not obtained (expansion to lower events are not done properly), the processing proceeds to S46, and the verification attribute of the event to be verified is set to 3 indicating "inconsistency".

At S47, it is determined whether an event with unknown physical quantity is included in the lower event or not. If the event with unknown physical quantity is included in the lower event, even if a positive determination is made at S45, it is likely that consistency is not obtained, and thus, the processing proceeds to S48, and the verification attribute of the event to be verified is set to 2 indicating "possibility of inconsistency". Otherwise, since consistency is obtained (expansion to lower events is done properly), the processing proceeds to S49, and the verification attribute of the event to be verified is set to 4 indicating "consistent".

This processing is executed for all the events included in the XML data, and the verification attribute is set to all the events.

Figure 16:
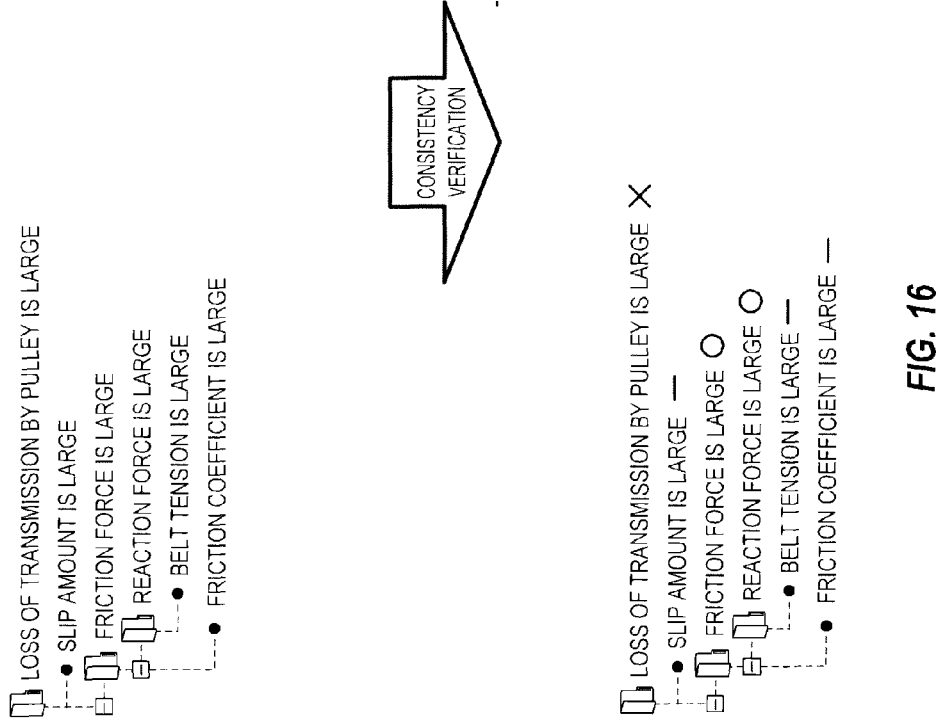
FIG. 16 is a diagram illustrating display of the display portion and XML data before and after consistency verification.

FIG. 16 illustrates display of the display portion 4 and the XML data before and after the consistency verification.

By executing the consistency verification, a value of the verification attribute of each event is set, and in the tree structure displayed on the display portion 4, illustration indicating the verification result, that is, a circle for "consistent", a cross for "inconsistent", and a hyphen for "unverified", for example, are displayed on the right side of each event.

As a result, the user can easily know the possibility that an expansion to lower events are not done properly and a spot where expansion is not properly done, which can be referred to when the FT diagram is modified.

<Export Portion 25>

The export portion 25 has a function of converting the XML data edited by the editing portion 22 to a data format of the spreadsheet program.

Figure 17:
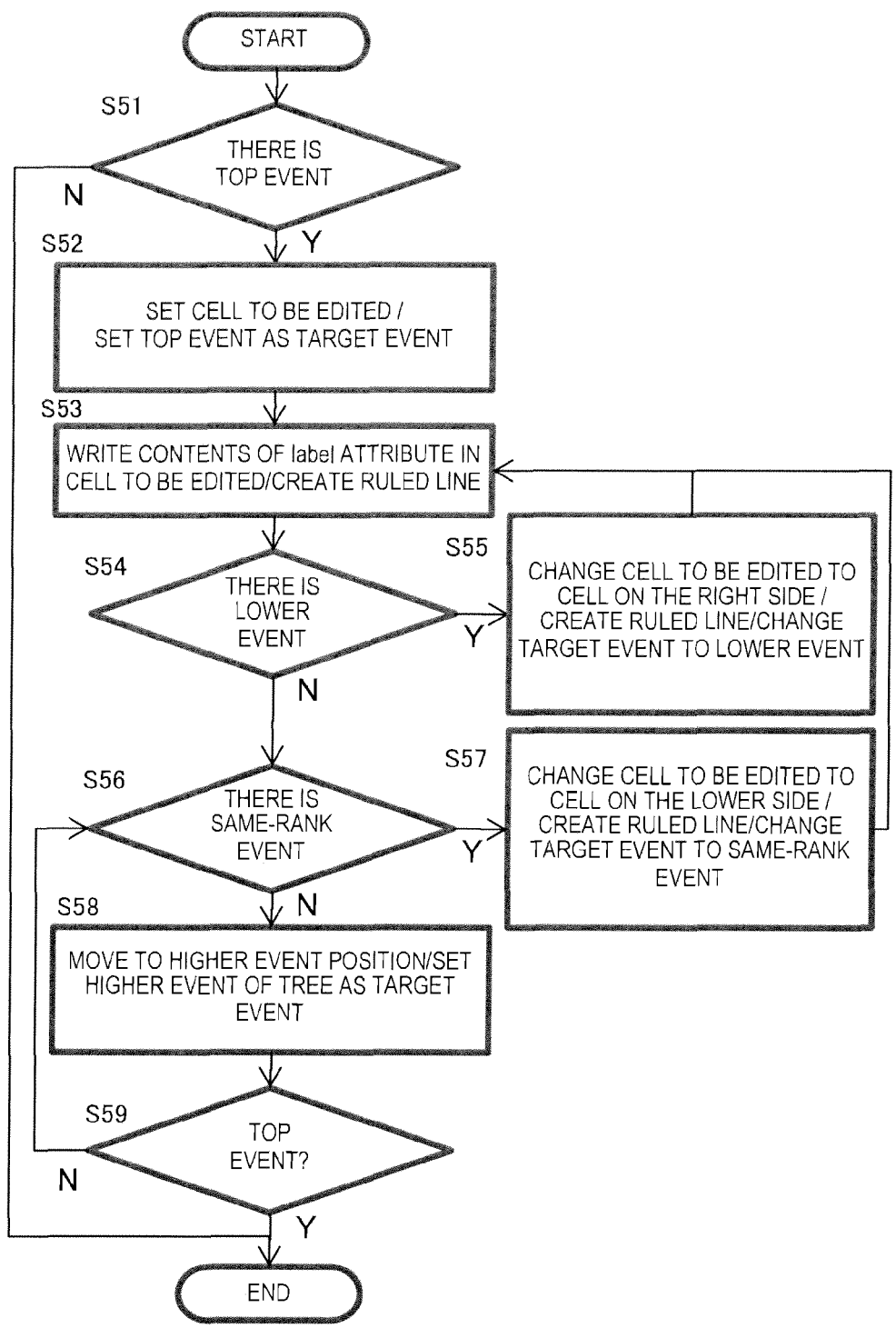
FIG. 17 is a flowchart illustrating processing contents of an export portion.

FIG. 17 is a flowchart illustrating processing contents (program contents) of the export portion 25. The processing contents of the export portion 25 will be described by referring to that.

First, the export portion 25 determines at S51 whether the XML data includes a top event or not. If a top event is not included, the processing is finished, while if a top event is included, the processing proceeds to S52.

At S52, the export portion 25 prepares an empty sheet of the spreadsheet program and sets a predetermined cell at the upper left of the sheet as a cell to be edited. Moreover, a top event of the XML data is set as a target event.

At S53, the export portion 25 writes the contents of the label attribute of the target event in the cell to be edited and surrounds the cell by a ruled line.

At S54, the export portion 25 determines whether there is a lower event for the target event or not. If there is a lower event, the processing proceeds to S55, while if not, the processing proceeds to S56.

At S55, the export portion 25 changes the cell to be edited to a cell on the right side by the predetermined number of cells and draws a ruled line extending to the cell. Moreover, if a relationship between the target event and the lower event is a logical product, characters of "AND" is written in an empty cell located on the upper side of the ruled line. And the target event is changed to the lower event.

Subsequently, the processing returns to S53, and the export portion 25 writes the contents of the label attribute of the target event in the cell to be edited and surrounds the cell by a ruled line.

If there is another lower event, S53 to S55 is repeated, while if it is determined there is no further lower event, the processing proceeds to S56.

At S56, the export portion 25 determines if there is a same-rank event for the target event. If there is a same-rank event, the processing proceeds to S57, while if not, the processing proceeds to S58.

At S57, the export portion 25 changes the cell to be edited to a cell on the lower side by the predetermined number of cells and draws a ruled line extending to the cell. And the target event is changed to the same-rank event.

Subsequently, the processing returns to S53, and the export portion 25 writes the contents of the label attribute of the target event in the cell to be edited and surrounds the cell by a ruled line.

While there is another same-rank event, S53 to S57 is repeated, while if it is determined there is no further same-rank event, the processing proceeds to S58.

At S58, the export portion 25 moves the cell to be edited to a cell corresponding to a higher event and changes the target event to a higher event corresponding to the cell.

At S59, the export portion 25 determines if the target event is a top event or not. If it is not a top event, the processing returns to S56, and it is further determined whether there is a same-rank event of the target event, and if it is determined to be a top event, the processing is finished.

By means of the aforementioned processing, the XML data is converted to a data format of the spreadsheet program.

Figure 18:
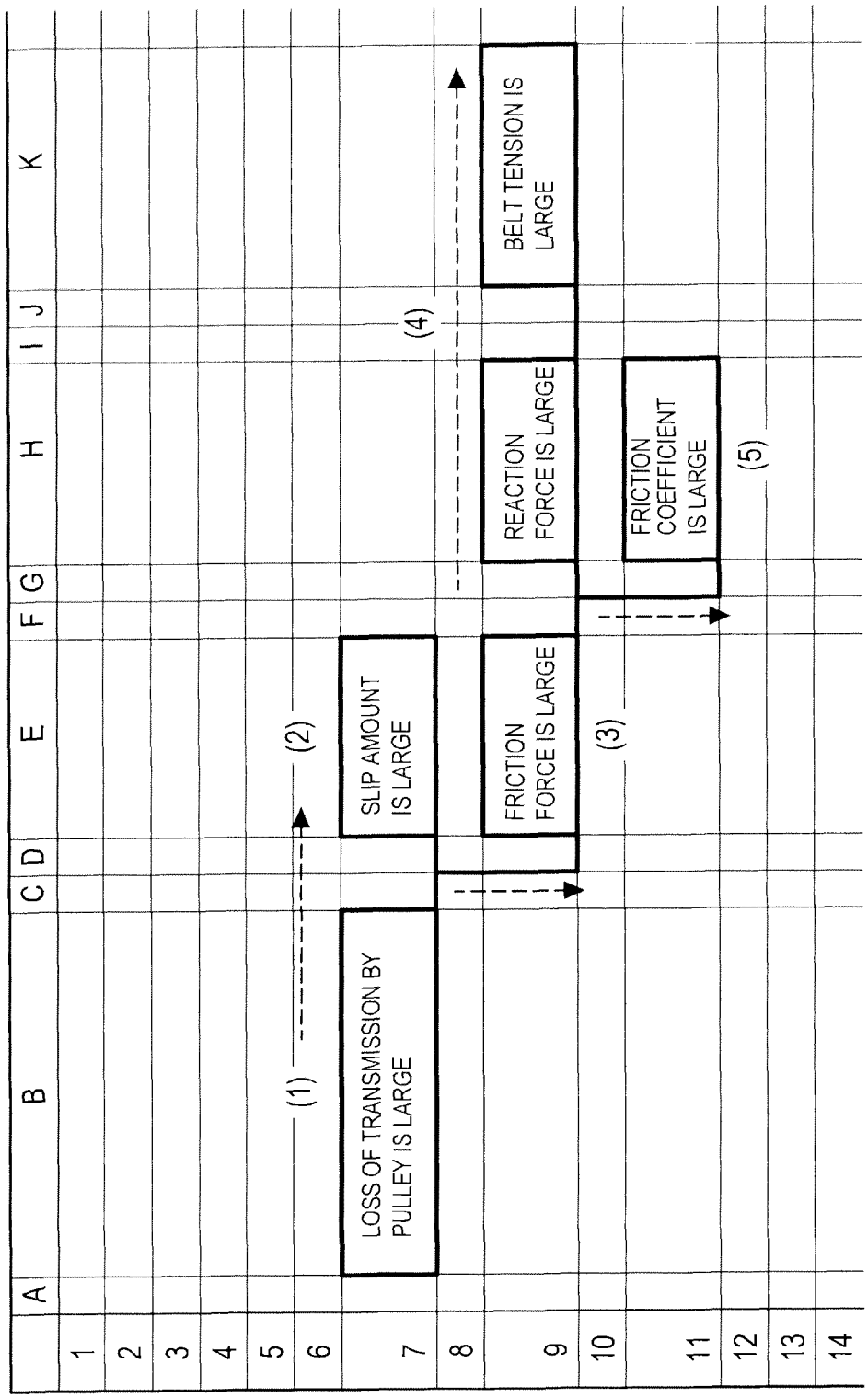
FIG. 18 is a diagram illustrating a state in which the XML data is converted to a data format of a spreadsheet program by the export portion.

FIG. 18 illustrates a state in which the XML data is converted by the export portion 25 to a data format of the spreadsheet program.

According to the aforementioned processing, first, the contents of the label attribute of the top event "loss of transmission by pulley is large" is written in a predetermined cell on the upper left of the sheet of the spreadsheet program, and the cell is surrounded by a ruled line ((1) in the figure).

Subsequently, a ruled line is drawn up to a third cell on the right side from the cell of the top event, the label attribute of a lower event "slip amount is large" is written in the cell, and the cell is surrounded by a ruled line ((2) in the figure).

Subsequently, a ruled line is drawn to a cell lower by two cells than the cell in which "slip amount is large" is written, the contents of the label attribute of the same-rank event, "friction force is large" is written in the cell, and the cell is surrounded by a ruled line ((3) in the figure).

Similarly, cells in which "reaction force is large", "belt tension is large", and "friction coefficient is large" are written, respectively, and ruled lines connecting them are created ((4) and (5) in the figure).

As described above, an FT diagram is created on a sheet of the spreadsheet program. The created data can be delivered to a server or a personal computer outside the device through the input/output portion.

The embodiment of the present invention has been described above, but the aforementioned embodiment only illustrates one of application examples of the present invention and is not intended to limit a technical scope of the present invention to a specific configuration of the embodiment.

The present application claims priority based on Japanese Patent Application No. 2011-211325 filed on Sep. 27, 2011, and the whole contents of this application are incorporated in this description by reference.

The invention claimed is:

1. An Fault Tree (FT) diagram generation aid device, comprising:
   an import portion adapted to obtain a connection relationship of ruled lines and character strings from first data which is data of an FT diagram expressing a tree structure by the ruled lines and the character strings on a sheet of a spreadsheet program, to acquire an event included in the FT diagram and a connection relationship between events from an obtained connection relationship of the ruled lines and the character strings, and to generate second data describing the tree structure of the FT diagram in a markup language based on the event included in the FT diagram and the connection relationship between events; and
   an editing portion adapted to edit the second data to generate third data describing the tree structure of the edited FT diagram in the markup language, wherein
   the import portion generates the second data by making a computer:
      repeatedly execute first processing of setting a specific cell surrounded by a ruled line as a cell to be analyzed, discovering a lower event of the cell to be analyzed by following a ruled line extending on a right side of the cell to be analyzed and by searching a cell surrounded by a ruled line beyond the same, arranging an element of the lower event between a start tag and an end tag of the cell to be analyzed in the second data, and setting a cell of the lower event as a new cell to be analyzed until no additional new lower event is discovered after a cell of a top event is set as a first cell to be analyzed;
      repeatedly execute second processing of, when no additional new lower event is discovered, discovering a same-rank event of the cell to be analyzed by following a ruled line branching downward from a ruled line extending to a left side from the cell to be analyzed and by searching a cell surrounded by a ruled line beyond the same, arranging an element of the same-rank event in parallel with the element of the cell to be analyzed in the second data, setting the cell of the same-rank event as a new cell to be analyzed, and repeating the first processing until no additional new lower event is discovered, until no additional new same-rank event is discovered; and
      repeatedly execute third processing of, when no additional new same-rank event is discovered, setting a higher event of the same-rank event discovered immediately before as a new cell to be analyzed, and repeating the second processing until no additional new same-rank event is discovered, until the cell to be analyzed becomes the cell of the top event.

2. The FT diagram generation aid device according to claim 1, further comprising:
   an export portion adapted to express the tree structure of the FT diagram by the ruled lines and the character strings on the sheet of the spreadsheet program based on the third data, wherein fourth data is generated.

3. The FT diagram generation aid device according to claim 1, further comprising:
   a consistency verification portion adapted to verify the second or third data by obtaining a physical quantity of each event from the second or third data and by determining that consistency of the second or third data is not obtained if the physical quantity of a specific event and the physical quantity of a lower event thereof do not share the same unit and the physical quantity of the specific event cannot be expressed by multiplication, division or exponentiation of the unit of the physical quantity of the lower event.

4. The FT diagram generation aid device according to claim 1, further comprising:
   a display portion, wherein
   the editing portion displays the FT diagram on the display portion based on the second data, and if modification of the FT diagram is instructed on the display portion, contents of the modification are reflected in the second data, wherein the third data is generated.

5. A non-transitory computer readable storage medium storing a program which allows a computer to realize:
   an import function for obtaining a connection relationship of ruled lines and character strings from first data which is data of an Fault Tree (FT) diagram expressing a tree structure by the ruled lines and the character strings on a sheet of a spreadsheet program, acquiring an event included in the FT diagram and a connection relationship between events from an obtained connection relationship of the ruled lines and the character strings, and generating second data describing the tree structure of the FT diagram in markup language based on the event included in the FT diagram and the connection relationship between events; and an editing function for editing the second data to generate third data describing the tree structure of the FT diagram in the markup language, wherein the import function generates the second data by making a computer:

repeatedly execute first processing of setting a specific cell surrounded by a ruled line as a cell to be analyzed, discovering a lower event of the cell to be analyzed by following a ruled line extending on a right side of the cell to be analyzed and by searching a cell surrounded by a ruled line beyond the same, arranging an element of the lower event between a start tag and an end tag of the cell to be analyzed in the second data, and setting a cell of the lower event as a new cell to be analyzed until no additional new lower event is discovered after a cell of a top event is set as a first cell to be analyzed;

repeatedly execute second processing of, when no additional new lower event is discovered, discovering a same-rank event of the cell to be analyzed by following a ruled line branching downward from a ruled line extending to a left side from the cell to be analyzed and by searching a cell surrounded by a ruled line beyond the same, arranging an element of the same-rank event in parallel with the element of the cell to be analyzed in the second data, setting the cell of the same-rank event as a new cell to be analyzed, and repeating the first processing until no additional new lower event is discovered, until no additional new same-rank event is discovered; and repeatedly execute third processing of, when no additional new same-rank event is discovered, setting a higher event of the same-rank event discovered immediately before as a new cell to be analyzed, and repeating the second processing until no additional new same-rank event is discovered, until the cell to be analyzed becomes the cell of the top event.

6. The non-transitory computer readable storage medium storing the program according to claim 5, wherein
the program allows the computer to further realize an export function for expressing the tree structure of the FT diagram by the ruled lines and the character strings on the sheet of the spreadsheet program based on the third data, wherein fourth data is generated.

7. The non-transitory computer readable storage medium storing the program according to claim 5, wherein
the program allows the computer to further realize a consistency verification function for obtaining a physical quantity of each event from the second or third data and if the physical quantity of a specific event and the physical quantity of a lower event thereof do not share the same unit and the physical quantity of the specific event cannot be expressed by multiplication, division or exponentiation of the unit of the physical quantity of the lower event, for determining that consistency of the second or third data is not obtained and for verifying consistency of the second or third data.

8. The non-transitory computer readable storage medium storing the program according to claim 5, wherein
the editing function is a function for displaying the FT diagram on a display portion of the computer based on the second data, and if modification of the FT diagram is instructed on the display portion, contents of the modification are reflected in the second data, wherein the third data is generated.

9. An Fault Tree (FT) diagram generation aid method, comprising:

an import procedure for obtaining a connection relationship of ruled lines and character strings from first data which is data of an FT diagram expressing a tree structure by the ruled lines and the character strings on a sheet of a spreadsheet program, acquiring an event included in the FT diagram and a connection relationship between events from an obtained connection relationship of the ruled lines and the character strings, and generating second data describing the tree structure of the FT diagram in a markup language based on the event included in the FT diagram and the connection relationship between events; and an editing procedure for editing the second data to generate third data describing the tree structure of the edited FT diagram in the markup language, wherein the import procedure generates the second data by:

repeatedly executing first processing of setting a specific cell surrounded by a ruled line as a cell to be analyzed, discovering a lower event of the cell to be analyzed by following a ruled line extending on a right side of the cell to be analyzed and by searching a cell surrounded by a ruled line beyond the same, arranging an element of the lower event between a start tag and an end tag of the cell to be analyzed in the second data, and setting a cell of the lower event as a new cell to be analyzed until no additional new lower event is discovered after a cell of a top event is set as a first cell to be analyzed;

repeatedly executing second processing of, when no additional new lower event is discovered, discovering a same-rank event of the cell to be analyzed by following a ruled line branching downward from a ruled line extending to a left side from the cell to be analyzed and by searching a cell surrounded by a ruled line beyond the same, arranging an element of the same-rank event in parallel with the element of the cell to be analyzed in the second data, setting the cell of the same-rank event as a new cell to be analyzed, and repeating the first processing until no additional new lower event is discovered, until no additional new same-rank event is discovered; and repeatedly executing third processing of, when no additional new same-rank event is discovered, setting a higher event of the same-rank event discovered immediately before as a new cell to be analyzed, and repeating the second processing until no additional new same-rank event is discovered, until the cell to be analyzed becomes the cell of the top event.

10. The FT diagram generation aid method according to claim 9, further comprising:
an export procedure for expressing the tree structure of the FT diagram by the ruled lines and the character strings on the sheet of the spreadsheet program based on the third data, wherein fourth data is generated.

11. The FT diagram generation aid method according to claim 9, further comprising:
a consistency verification procedure for verifying the second or third data by obtaining a physical quantity of each event from the second or third data and by determining that consistency of the second or third data is not obtained if the physical quantity of a specific event and the physical quantity of a lower event thereof do not share the same unit and the physical quantity of the specific event cannot be expressed by multiplication, division or exponentiation of the unit of the physical quantity of the lower event.

12. The FT diagram generation aid method according to claim 9, wherein:
the editing procedure displays the FT diagram on a display portion based on the second data, and if modification of the FT diagram is instructed on the display portion, contents of the modification are reflected in the second data, wherein the third data is generated.

* * * * *